Figure 1:
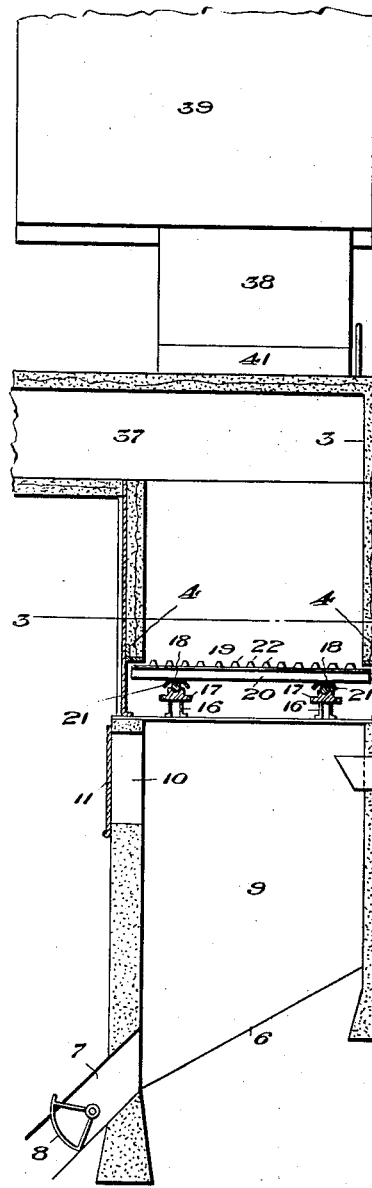

G. H. DERN & T. P. HOLT.
BLAST ORE ROASTER.
APPLICATION FILED AUG. 25, 1916.

1,251,189.

Patented Dec. 25, 1917.
2 SHEETS—SHEET 1.

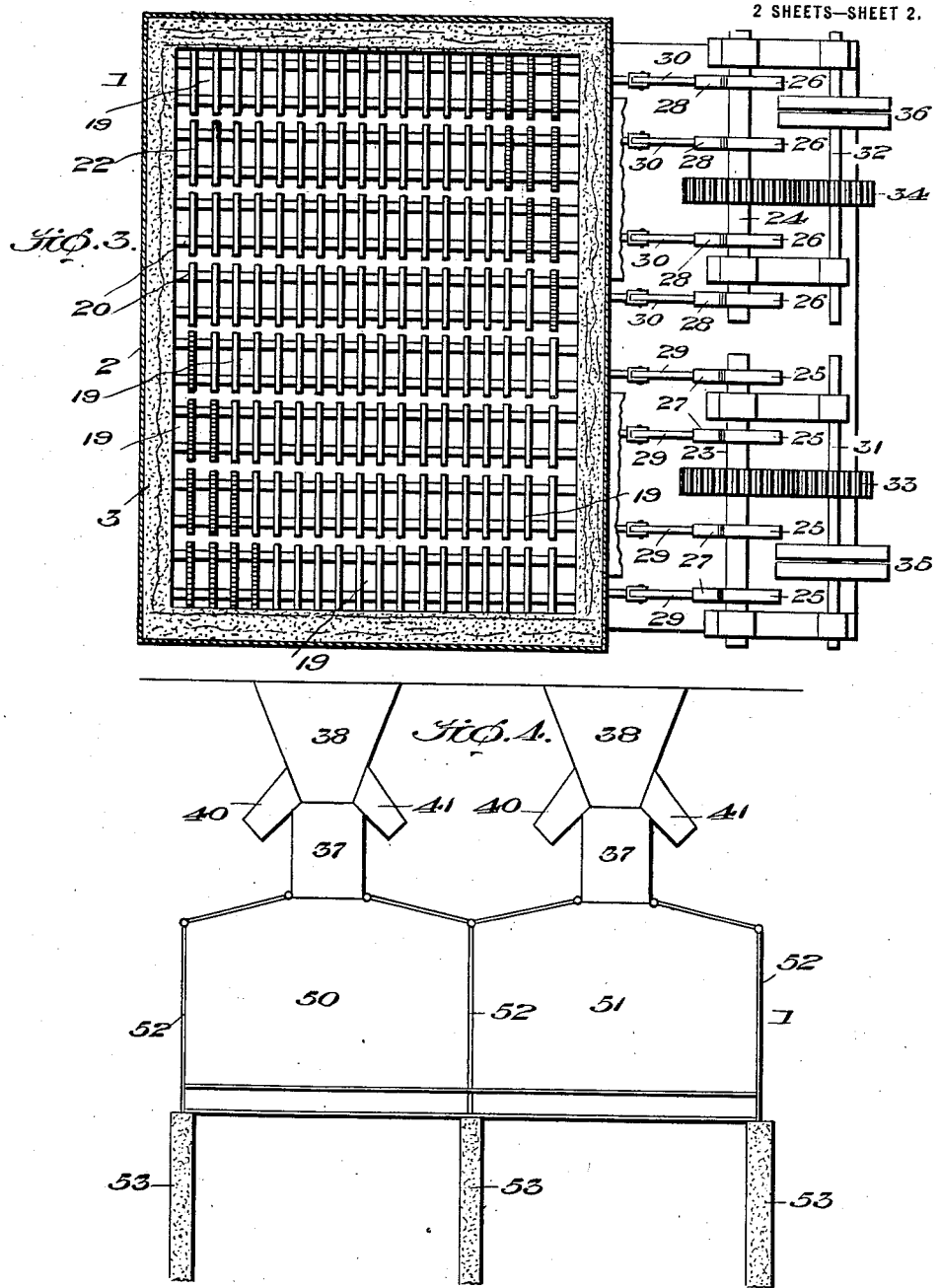

UNITED STATES PATENT OFFICE.

GEORGE H. DERN, OF SALT LAKE CITY, AND THEODORE P. HOLT, OF SILVER CITY, UTAH, ASSIGNORS TO HOLT-CHRISTENSEN PROCESS COMPANY, OF PROVO, UTAH, A CORPORATION OF UTAH.

BLAST ORE-ROASTER.

1,251,189.                Specification of Letters Patent.        Patented Dec. 25, 1917.

Application filed August 25, 1916. Serial No. 116,918.

*To all whom it may concern:*

Be it known that we, GEORGE H. DERN and THEODORE P. HOLT, citizens of the United States, residing, respectively, at Salt Lake City, county of Salt Lake, State of Utah; and Silver City, county of Juab, State of Utah, have invented certain new and useful Improvements in Blast Ore - Roasters, of which the following is a specification.

This invention, which relates to blast ore roasters, embodies improvements on the blast ore roasters set forth in our Patents Nos. 1,113,961 and 1,113,962, dated October 20, 1914.

The present improvements, while possessing all of the advantages of the blast ore roasters of our aforesaid patents, obtain the added advantages and new results thereover set forth hereinafter.

To afford a satisfactory draft without a tendency to carry off the fine, crushed ore when the roaster is being charged, the smoke flue surmounts the roasting chamber in crosswise relation thereto. The charge-supporting, crushing grate is composed of sections or areas which may be driven independently of the remainder thereof so that if the columnar roast settles more slowly in one part than in another, that portion of the grate supporting the more slowly settling part may be operated a greater length of time and much work thereby saved in leveling off the charge.

Uniform distribution of the fresh ore to the roasting chamber is obtained by using a plurality of controlled ore chutes, feeding to points above the independently driven portions of the grate.

The top of the roasting chamber has a plurality of doors counterweighted so that they may be easily opened and closed by hand, preferably closing the roasting chamber on opposite sides of the smoke flue. The ore spouts are arranged to discharge, respectively, into the openings closed by the doors.

The body of the roaster rests directly upon the ore-collecting bin, which may be of concrete to insure permanency and cheapness of construction, thereby eliminating the escape of dust when the ore is dropped by operating the grate and enabling the hot mass of dropped ore to remain for any desired period of time. It is of advantage in chloridizing many ores to thus allow the hot roasted mass to slowly cool before drawing it off through a suitable ore gate, inasmuch as a substantial increase in the subsequent extraction is thereby obtained.

The construction of our roaster being unitary, the side walls of the roasters may be used in common where they join, enabling large installations to be made compactly and at reduced cost by building the roasters side by side in series, to any desired extent.

Figure 2:
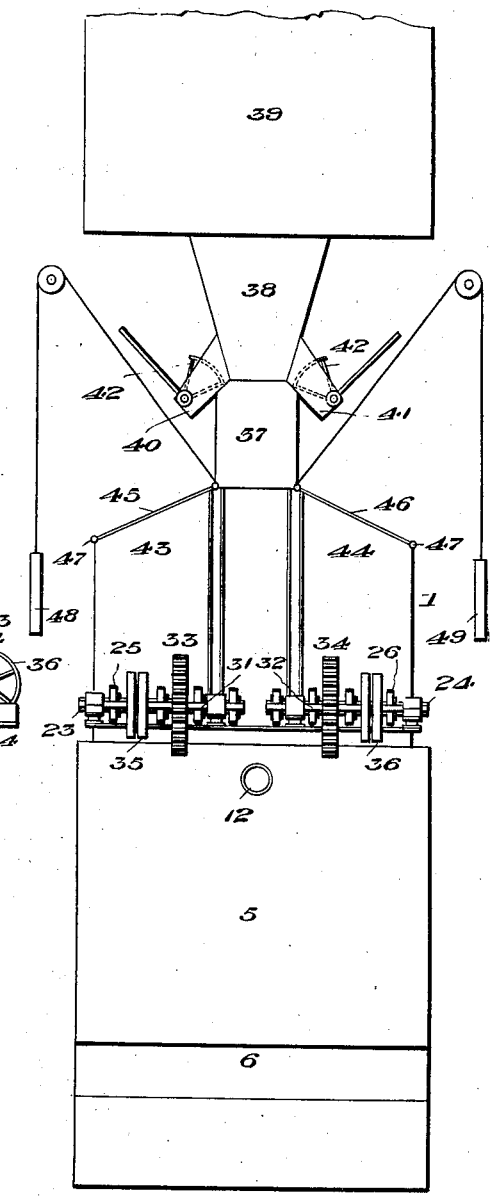

The embodiment of the invention disclosed in the drawings and hereinafter described is, in the broader aspect thereof, capable of modification within the spirit and scope of the invention and, except where limited in the appended claims, is to be deemed as illustrative, rather than restrictive, of the scope of the invention In the accompanying drawings:

Figure 1 is a vertical section through our roaster;

Fig. 2, a rear elevation thereof;

Fig. 3, a sectional view on line 3—3, Fig. 1; and

Fig. 4, an elevation, more or less diagrammatic, illustrating how the roasters may use a side wall in common when two or more are installed.

The body 1 of the roaster is preferably square or rectangular in cross section, and has an outer, metallic shell 2 and a lining 3 of refractory material to conserve the heat and protect the shell 2 from corrosive gases. Angle iron construction 4 is provided to support the refractory lining 3. The shell 2 rests upon a bin-setting 5 of concrete which has a suitable foundation and may be provided with a sloping bottom 6 leading to a discharge chute 7 controlled by an ore gate 8, which, upon being opened, will permit the roasted, cooled ore contained within the bin 9 provided by the bin-setting 5, to gravitate to the exterior of the bin-setting. Instead of a sloping bottom 6, the bottom may be flat so that a sloping bottom will be formed by the roasted ore. Or, the bottom may be flat with a tunnel or passage-way underneath, and the gate 8 be located in the bottom to discharge into a car, skip conveyer, launder, etc. One or more man holes 10 may be provided in the upper portion of the bin-setting 5 and covered by any suitable closure 11. Peep holes, having small special covers, are provided in the closures 11 to enable observations to be taken of the interior of the bin-setting, to see that the roasted ore does not pile up high enough to obstruct the blast pipe 12, and to leave a sufficient open space to form an air chamber to distribute the air pressure.

By supporting the roaster on the bin-setting 5, the hot mass of ore, after being crushed and dropped by the grate, may be allowed to remain until sufficiently, slowly cooled in the bin 9 before being drawn off through the chute 7, which is of advantage in chloridizing many ores. Furthermore, this bin 9, which can be of any depth desired, eliminates the formation and escape of dust when the ore is dropped.

An air blast may be delivered through conduit or pipe 12, into the upper portion of the bin 9, controlled at will by a gate or other valve 13 operated by a pull-rod or other means 14 from the working floor or platform 15.

Channel irons 16 whose ends rest upon the top of the bin 9, have secured thereto at intervals of their length, chairs or blocks 17 having dished or concaved upper faces in which rollers 18 lie for the support of a plurality of relatively reciprocatable grate sections 19, which, as shown in Fig. 3, comprise bars 20 having inverted, dished guards 21 which bear upon the rollers 18 and are provided with toothed, transverse grate bars 22. The grate thus provided, composed of a plurality of sections, is adapted to reciprocate when the roasted ore column is to be dropped, in the space between the lower end of the refractory lining 3 and the upper end of the bin 9. Each section of the grate constitutes a crushing device which may be reciprocated in connection with the other grate sections.

Any suitable means may be provided for reciprocating the grate sections as, for instance, independent shafts 23, 24, respectively carrying eccentrics 25 in the one instance, and 26 in the other instance. Eccentric straps 27, in the one instance, and 28, in the other instance, coöperate with the eccentrics on the shafts 23 and 24 and are connected by links 29, in the one instance, and 30, in the other instance, to the respective grate bar sections 19. The eccentrics and their connections are preferably set so that contiguous grate bar sections 19 travel in opposite directions in relation to each other, thereby distributing the crushing strain transmitted transversely through the ore column to the roaster shell and obviating alternate subjection of opposite walls of the roaster to great pressure. Furthermore, by the arrangement described, we obviate the tendency which would otherwise exist to carry the entire columnar charge of ore supported by the grate bodily back and forth with incident formation of air channels along the sides of the shell.

The ends of the grate sections underlie the lower ends of the walls of the refractory lining 3, below the angle iron supports 4 which prevents the ore from getting in between the ends of the grate sections and the wall of the roaster and prevents breakage.

The spacing of the blocks 17 affords little obstruction to the free dropping of the fresh, roasted ore and the guards 21 shield the rollers 18 from dust and ore.

The respective shafts 23, 24, are driven from countershafts 31, 32, by gears 33, 34. The shafts 31, 32 carrry fast and loose belt pulleys 35, 36 driven by a suitable belt. One-half of the grate bar sections 19 are driven from the shaft 23 and the remaining grate bar sections are driven by the shaft 24, the complete set of sections constituting the grate which supports the entire ore column which is undergoing roasting. Suitable controlling means of any well-known or preferred form being provided to couple the fast pulley of the set 35 to the power, or, the fast pulley of the set 36 to the power, one or the other of the sets of grate bar sections may be reciprocated, the respective sections of the given set operating as previously described. Consequently, either half of the complete grate may be shaken, or both sections operated, at will, to enable either half of the ore column to be shaken according to requirements. For instance, if the roast settles slowly on one set of grate sections, while settling relatively fast on the other grate sections, the grate sections on the slow settling side of the column may be operated a greater length of time than the other sections, thereby enabling uniform settling of the roast to be had and saving considerable work in leveling off the charge.

We do not limit ourselves to a grate of but two sections, as a greater number of sections, capable of being shaken independently of the remaining sections of the grate, could be employed. Furthermore, as we are aware that other means for shaking the grate could be employed, we do not restrict ourselves to the specific means set forth.

The smoke flue 37, which is of refractory material, is superposed upon the roaster and extends horizontally thereof, being open through the interior of the roaster the full width of the latter, thus providing a more uniform draft on the body of ore than would be afforded by a flue let into the side of the roaster and preventing the carrying off of the fine ore when the roaster is being charged.

A loading chute 38 leading from the ore bin 39, has branched, independent discharge chutes 40 and 41, each having its controlling gate 42 and arranged to discharge on opposite sides of the smoke flue 37 into the open top portions 43 and 44 of the roaster which, in turn, are above the respective sets of grate sections that are actuated by the shafts 23, 24, so that an independent ore supply may be had for either side of the roaster and the ore may be let into either side of the roaster according to the settling or shaking down of the roast at that side thereof.

The openings 43, 44 are closed by independent doors 45, 46, respectively hinged at 47, which are individually counterweighted as at 48, 49, so that these doors may be readily opened or closed by hand independently of each other.

Our roaster being of a unitary construction, complete units may be installed to any desired extent as illustrated, more or less diagrammatically, in Fig. 4. In that figure, while there are only two complete, self-contained roasters 50, 51, shown, this is merely illustrative, as others could be added. The walls 52 of the roasting chambers and 53 of the bins, where two roasters join, are common to each roaster, thereby cheapening the cost of building and rendering installation compact, where a number of roasters are combined.

The roasting process is carried on in the manner set forth in our Patents Nos. 1,113,961 and 1,113,962, dated October 20, 1914.

While we have shown and described our present improvements as applied to a roaster having a grate of the reciprocatory type set forth in our Patent 1,113,961, nevertheless they are just as applicable to a roaster having a rocking or revolving grate such as set forth in our Patent 1,113,962 and our claims are to be construed, except where expressly limited, to cover either type of grate where a grate is recited therein.

Having thus described our invention, what we claim as new and desire to secure by Letters Patent, is:—

1. In an ore roaster, a charge holding chamber, a grate therefor comprising independently movable sections, and means whereby any section of said grate may be selectively operated independently of any remaining section thereof.

2. In an ore roaster, a charge holding chamber, a grate therefor comprising independently movable sections, and independent operating means for the respective movable grate sections whereby any section of said grate may be selectively operated independently of any remaining section, or, all of said sections may be operated at the same time.

3. In an ore roaster, a charge holding chamber, a grate therefor comprising independently movable sections each composed of sub-sections adapted to operate in opposite directions to each other, and operating means whereby any complete section of said grate may be selectively operated independently of any remaining section thereof.

4. In an ore roaster, a charge holding chamber, a grate therefor comprising independently movable sections each composed of sub-sections adapted to operate in opposite directions to each other, and independently operating means for the respective movable grate sections whereby any section of said grate may be selectively operated independently of any remaining section thereof.

5. In an ore roaster, a charge holder, a grate therefor comprising independently movable sections, means whereby any section of said grate may be selectively operated independently of any remaining section thereof to drop any desired portion of the ore column supported by said grate, a built-up bin supporting said charge holder forming a combined ore collecting and air pressure chamber located below said grate, and means for introducing an air blast into said combined ore collecting and air pressure chamber and upwardly through said grate.

6. In an ore roaster, a charge holding chamber, a grate therefor comprising independently movable sections each composed of sub-sections adapted to operate in opposite directions to each other, operating means whereby any complete section of said grate may be selectively operated independently of any remaining section thereof to drop any desired portion of the ore column supported by said grate, a combined collecting and air pressure chamber located below said grate, and means for introducing an air blast into said combined collecting and air pressure chamber and upwardly through said grate.

7. In an ore roaster, a charge holding chamber having a smoke flue superposed crosswise thereof and communicating therewith substantially the width of the chamber.

8. In an ore roaster, a charge holding chamber having a smoke flue superposed crosswise thereof and communicating therewith substantially the width of the chamber, and means for delivering ore into the chamber on either side of said flue.

9. In an ore roaster, a charge holding chamber having a smoke flue superposed crosswise thereof and communicating therewith substantially the width of the chamber, and independent, controlled, chutes for delivering ore into the chamber on both sides of said flue.

10. In an ore roaster, a charge holding chamber having a smoke flue superposed crosswise thereof and communicating therewith substantially the width of the chamber, said chamber being open at its top on opposite sides of said smoke flue, and independent doors for the respective openings.

11. In an ore roaster, a charge holding chamber having a smoke flue superposed crosswise thereof and communicating therewith substantially the width of the chamber, said chamber being open at its top on opposite sides of said smoke flue, independent doors for the respective openings, and independent, controlled, chutes for delivering ore into the respective top openings of the chamber.

12. In an ore roaster, a charge holding chamber, a grate therefor comprising independently movable sections, means whereby any section of said grate may be selectively operated independently of any remaining section thereof, and means whereby ore may be delivered into the chamber above either or both of said independently movable grate sections.

13. In an ore roaster, a charge holding chamber, a grate therefor comprising independently movable sections, means whereby any section of said grate may be selectively operated independently of any remaining section thereof, and independent, controlled, chutes for delivering ore into the chamber above either or both of said independently movable grate sections.

14. In an ore roaster, a charge holding chamber, a grate therefor comprising independently movable sections, means whereby any section of said grate may be selectively operated independently of any remaining section thereof, a smoke flue superposed crosswise of the chamber, and means for delivering ore into the chamber on either, or both, sides of said flue above the respective independently movable grate sections.

15. In an ore roaster, a charge holder, a built-up bin supporting said charge holder, and a charge-supporting movable grate supported by said bin, whereby parts of the charge may be dropped into said bin to remain there for cooling purposes.

16. In an ore roaster, a charge holder, a built-up bin supporting said charge holder, a charge-supporting movable grate supported by said bin, and means for introducing an air blast into the upper portion of said bin and upwardly through the grate, whereby parts of the charge may be dropped into said bin to remain there for cooling purposes without interfering with the introduction of the blast above the dropped ore.

In testimony whereof, we hereunto affix our signatures.

GEORGE H. DERN.
THEODORE P. HOLT.